United States Patent [19]

Sakai et al.

[11] Patent Number: 5,410,435
[45] Date of Patent: Apr. 25, 1995

[54] INFORMATION SIGNAL RECORDING APPARATUS FOR RECORDING TRACKING SIGNALS IN NONADJACENT TRACKING AREAS OF OBLIQUE TRACKS FORMED ON MAGNETIC RECORDING MEDIUM

[75] Inventors: Seiichi Sakai, Tokyo; Mikio Kita, Kanagawa, both of Japan

[73] Assignee: Sony Corporation, Tokyo, Japan

[21] Appl. No.: 133,843

[22] Filed: Oct. 12, 1993

[30] Foreign Application Priority Data

Oct. 14, 1992 [JP] Japan .................. 4-301754

[51] Int. Cl.⁶ ................. G11B 5/09; G11B 15/14; G11B 5/584
[52] U.S. Cl. .......................... 360/48; 360/64; 360/77.14
[58] Field of Search ................ 360/13, 14.1, 48, 64, 360/74.1, 77.13, 77.14, 73.14

[56] References Cited

U.S. PATENT DOCUMENTS

| | | | |
|---|---|---|---|
| 4,510,535 | 4/1985 | Tokumitsu | 360/73.14 |
| 5,053,890 | 10/1991 | Namiki | 360/77.14 |
| 5,233,488 | 8/1993 | Yanagihara | 360/77.15 |
| 5,313,338 | 5/1994 | Ichikawa et al. | 360/13 |
| 5,315,457 | 5/1994 | Ono et al. | 360/77.14 |

*Primary Examiner*—Aristotelis Psitos
*Assistant Examiner*—Won Tae C. Kim
*Attorney, Agent, or Firm*—William S. Frommer; Alvin Sinderbrand

[57] ABSTRACT

A magnetic tape recording apparatus having an ordinary recording mode and an editing mode in which an information signal is recorded additionally to information already stored in previously formed oblique tracks is provided in which a high degree of accuracy is assured for tracking servoing upon editing by forming on the tape a track area for tracking in an area at a predetermined position of every other one of the oblique tracks. After the recording apparatus forms a tracking area in a particular oblique track, the recording apparatus prevents its rotary head apparatus from forming another tracking area in an adjacent oblique track.

14 Claims, 11 Drawing Sheets

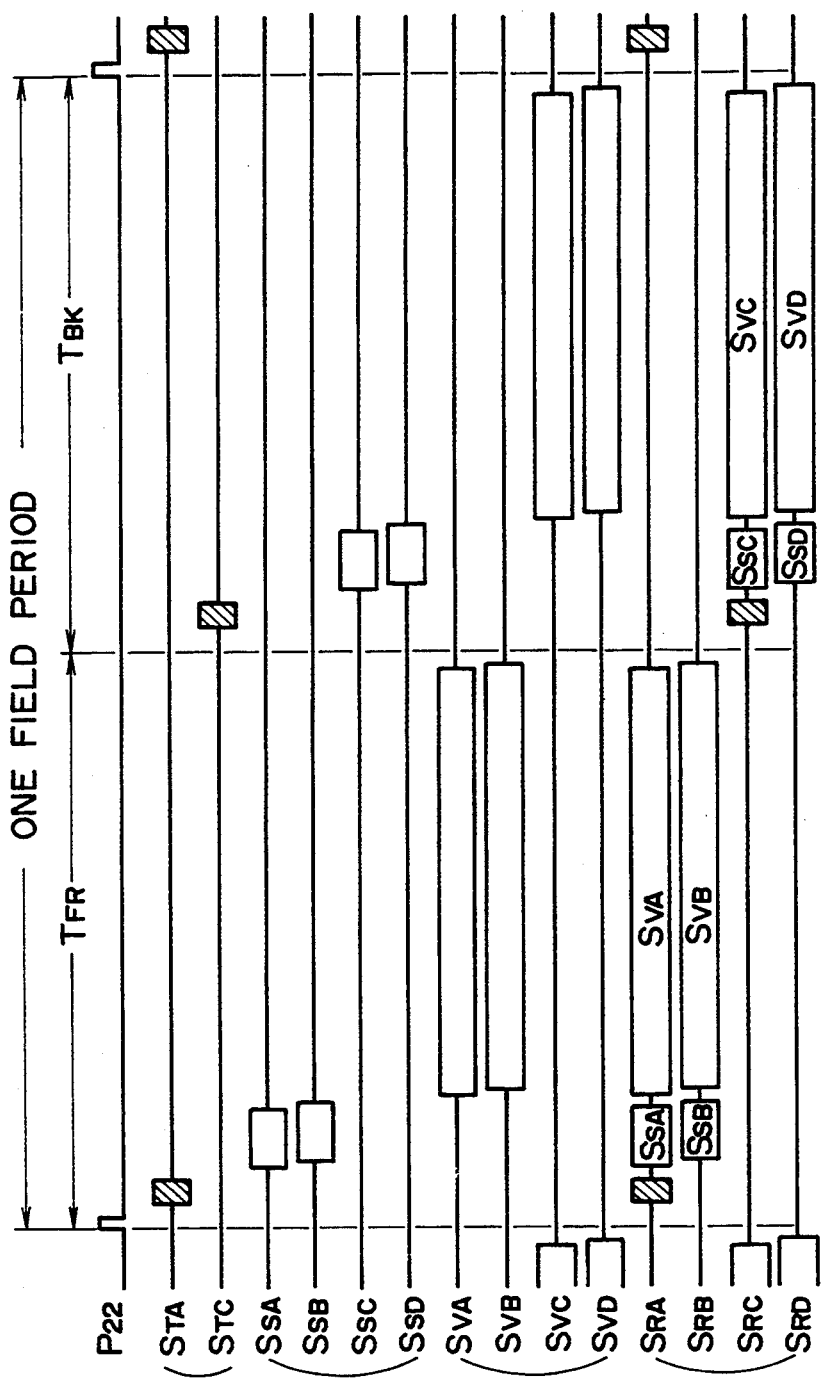

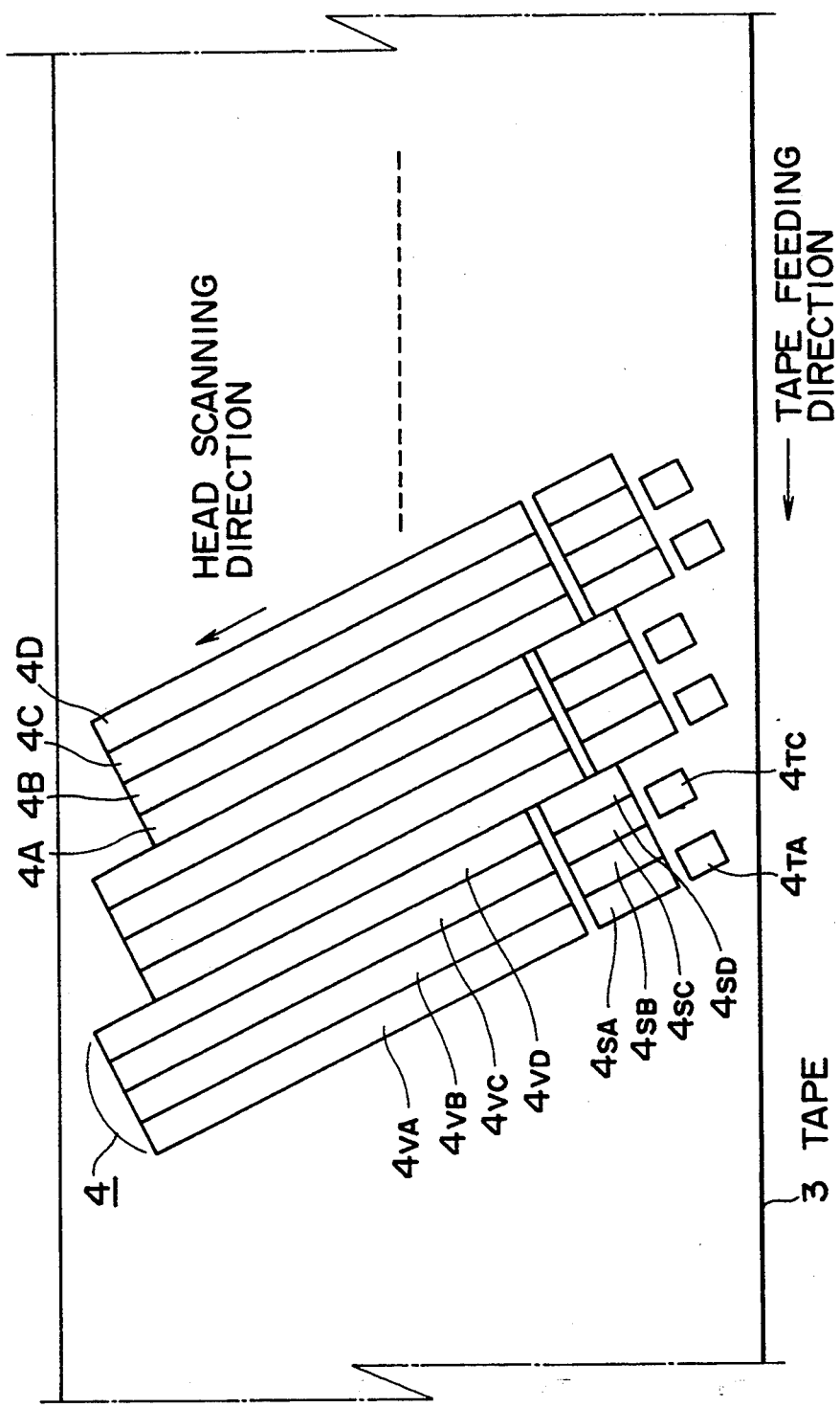

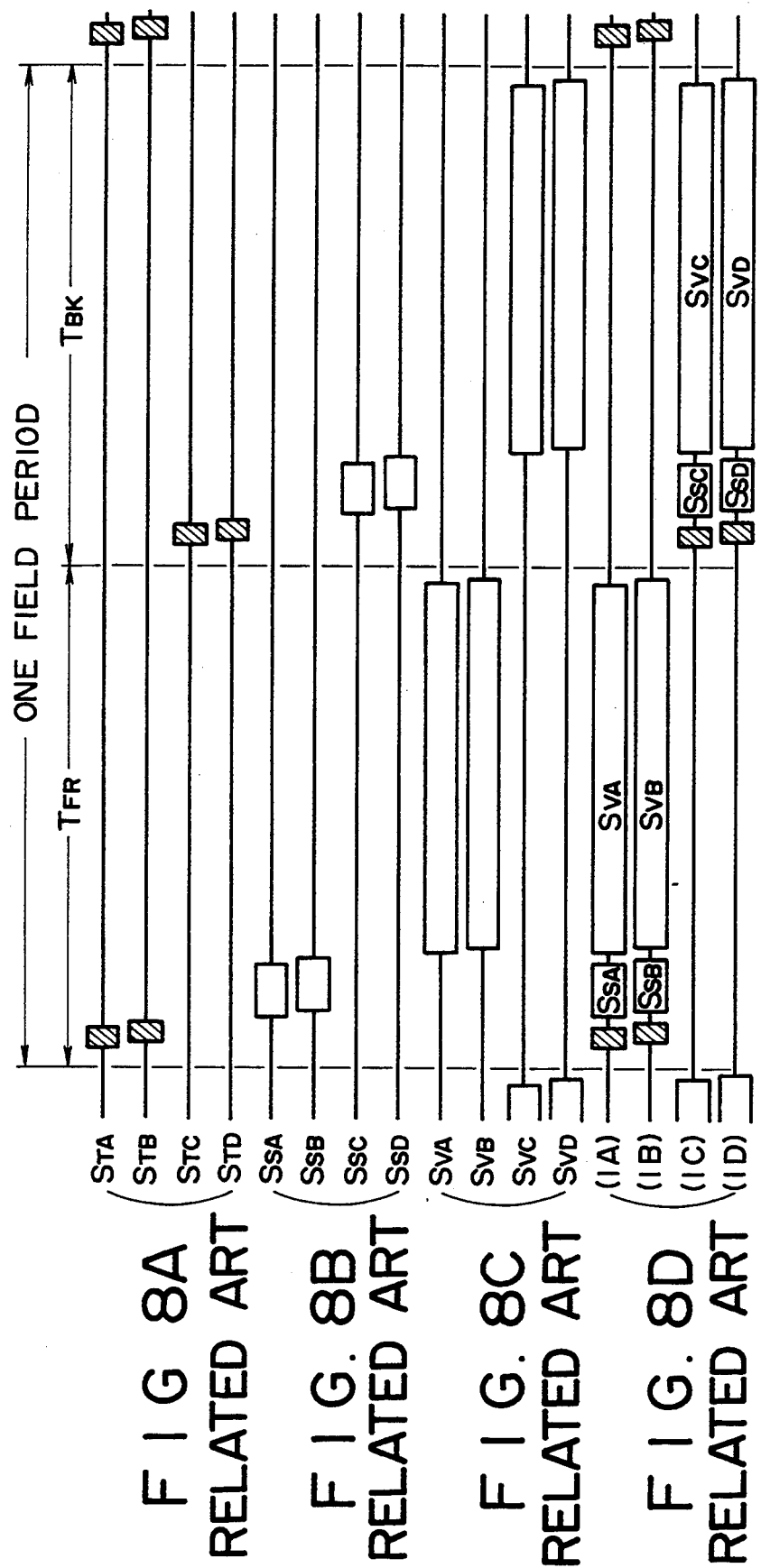

INFORMATION SIGNAL RECORDING APPARATUS FOR RECORDING TRACKING SIGNALS IN NONADJACENT TRACKING AREAS OF OBLIQUE TRACKS FORMED ON MAGNETIC RECORDING MEDIUM

BACKGROUND OF THE INVENTION

1. Field of the Invention

This invention relates to an information signal recording apparatus which employs a rotary magnetic head apparatus such as a video tape recorder.

2. Description of the Related Art

In video tape recorders, a Video signal is recorded in oblique magnetic tracks on a magnetic tape by means of a rotary magnetic head apparatus. However, in digital video tape recorders, since the amount of data to be recorded is great, generally a single digital video signal is divided into a plurality of channels and recorded in independent tracks on a magnetic tape for the respective channels.

FIGS. 7 to 9A to 9C illustrate an example of a manner in which a digital video signal is recorded divisionally in four A to D channels while a digital audio signal is recorded divisionally in a plurality of channels.

Referring first to FIG. 7, there is shown a rotary magnetic head apparatus which includes magnetic heads 1A to 1D. The magnetic heads 1A and 1B are located on a head drum 2 in an angularly spaced relationship by a predetermined angle $\theta$ and in a vertically offset relationship from each other while the other heads 1C and 1D are located on the head drum 2 similarly in an angularly spaced relationship by the predetermined angle $\theta$ and in a vertical offset relationship from each other. The magnetic heads 1A and 1B and the magnetic heads 1C and 1D are located in an angularly spaced relationship by 180 degrees from each other. The heads 1A and 1C and the heads 1B and 1D have opposite azimuth angles relative to each other.

The rotary magnetic head apparatus including the heads 1A to 1D is rotated in a field frequency in synchronism with an input video signal while a magnetic tape 3 is fed at a fixed speed obliquely along a circumferential face of the rotary magnetic head apparatus over an angular range greater than 180 degrees.

Referring also to FIGS. 8A to 8D, tracking signals STA and STB are formed at or around a starting point of time of the former half TFR of each field period, and tracking signals STC and STD are formed at or around a starting point of the latter half TBK of each field period. The tracking signals STA to STD are supplied to the heads 1A to 1D, respectively. It is to be noted that the signals STA to STD are, for example, alternating signals which have a fixed level at a fixed frequency and have different frequencies from one another.

Meanwhile, an input stereo audio signal is converted from an analog signal into a digital signal and divided into four A to D channels, and encoding processing for error correction, time base compression and delaying processing and modulation processing for recording are performed for the digital audio signals of the A to D channels so as to make, for example, digital audio signals SSA to SSD at the positions following the signals STA to STD, respectively, as seen from FIG. 8B. The signals SSA to SSD are supplied to the heads 1A to 1D, respectively.

Further, an input video signal is converted from an analog signal into a digital signal and divided into four A to D channels, and encoding processing for error correction, time base compression and delaying processing and modulation processing for recording are performed for the video signals of the A to D channels so as to make for example, digital audio signals SVA to SVD at the positions following the signals SSA to SSD as seen from FIG. 8C. The signals SVA to SVD are supplied to the head 1A to 1D, respectively.

As a result, such signals as seen in FIG. 8D are supplied to the heads 1A to 1D, and a set of tracks 4 are formed for each one field period as seen, for example, from FIG. 9B.

In particular, first, during the former half TFR of a one field period, the heads 1A and 1B scan the tape 2 obliquely and signals STA, SSA, SVA and STB, SSB, SVB are supplied to the heads 1A and 1B, respectively. Consequently, as shown in FIG. 9A, the signals STA and STB are recorded into track areas 4TA and 4TB at the top positions of two tracks 4, respectively, and then the signals SSA and SSB are recorded into track areas 4SA and 4SB at the positions following the track areas 4TA and 4TB of the two tracks 4, respectively. Finally, the signals SVA and SVB are recorded into track areas 4VA and 4VB at the positions following the track areas 4SA and 4SB of the two tracks 4, respectively.

Then, during the latter half TBK of the one field period, the heads 1C and 1D scan the tape 3 obliquely and signals STC, SSC, SVC and STD, SSD, SVD are supplied to the heads 1C and 1D, respectively. Consequently, as seen in FIG. 9B, the signals STC and STD are recorded into track areas 4TC and 4TD at the top positions of next two tracks 4, respectively, and then the signals SSC and SSD are recorded into track areas 4SC and 4SD at the positions following the track areas 4TC and 4TD of the tracks 4, respectively. Finally, the signals SVC and SVD are recorded into track areas 4VC and 4VD at the positions following the track areas 4SC and 4SD of the tracks 4, respectively.

Then, similar recording is performed also during a next field period so that next four tracks 4 are formed as seen in FIG. 9C, and thereafter, a video signal and an audio signal are recorded onto a set of tracks 4 for each one field period in a similar manner.

It is to be noted that, in this instance, the angular distance $\theta$ and the offset between the heads 1A and 1C and between the heads 1B and 1D and the feeding speed of the tape 3 are set in advance so that adjacent track areas (tracks) may be formed in a contiguous relationship to each other.

In this manner, a digital video signal can be digitally recorded by dividing it, for example, into four A to D channels in this manner.

In this instance, for example, the track areas 4TA, 4SA and 4VA are portions of a single track formed by single scanning of the head 1A, and the widths and the positions of them in the widthwise direction are equal to each other. This similarly applies to all of the other track areas.

Accordingly, upon reproduction, the heads 1A to 1D can scan the tracks 4 regularly by performing tracking servoing using the track areas 4TA to 4TD.

Further, upon editing, by recording a new video signal or audio signal with reference to the track areas 4TA to 4TD for tracking, the positions of the track areas 4VA to 4VD or 4SA to 4SD to be formed in response to the new video signal or audio signal can be made to coincide with the original track areas 4VA to 4VD or 4SA to 4SD.

Accordingly, upon editing, it does not occur that the new track areas 4SA to 4SD or 4VA to 4VD are overwritten with part of the original track areas 4VA to 4VD or 4SA to 4SD or on the contrary the original areas 4VA to 4VD or 4SA to 4SD remain without being erased.

Further, even if editing is performed, since it does not occur that overwriting takes place with a necessary track area or an original track area remains unerased, the non-recorded portions between the track areas 4SA to 4SD and 4VA to 4VD, that is, guard section, can be reduced sufficiently, thereby enhancing the rate of utilization of the tape 3.

It is to be noted that, in the following description, when it is not necessary to distinguish the track areas 4TA, 4SA and 4VA from each other, they are represented by the track 4A, and also the other track areas are represented by the track 4B, 4C or 4D.

By the way, electronic editing of the tape 3 is divided into two types including insert editing and assemble editing, and both types of editing involves the following processing:

(1) The tape 3 is rewound, for example, for three seconds from an editing start point.

(2) Reproduction of the tape 3 is started from the thus rewound point. In this instance, the reproduction is performed in synchronism with a video signal to be recorded newly as a result of editing.

(3) After the tape 3 reaches the editing start point, the video tape recorder is changed over from the reproduction mode to the recording mode.

In short, if such processing is performed, then no disorder of the arrangement of the tracks 4 takes place at the editing start point, and accordingly, a reproduced screen or reproduced sound is not disordered at the editing start point.

Actually, however, if editing of a tape is performed where such servo control as described above is involved, a trouble sometimes occurs with a result of such editing.

In particular, as shown in FIG. 10, ideally the track widths WTA to WTD of the tracks 4A to 4D are equal to a designed value WT0.

Actually, however, when the heads 1A to 1D are mounted onto the head drum 2, some errors occur with the offsets HHB and HHC of the heads 1B and 1C from the mounting reference plane. As a result, upon recording, an edge portion of the track 4B formed by the head 1B is erased by the following or trailing head 1C so that the track width WTB of the track 4B is reduced from the designed value WT0.

If the tolerances (allowable values of errors) of the offsets HHB and HHC are, for example, $\pm 1.5$ μm with respect to the designed values of them, then, in the worst case, that is, when an error of 1.5 μm occurs in the offset increasing direction with the offset HHB and another error of 1.5 μm occurs in the offset decreasing direction with the offset HHC, the track width WTB of the track area 4TB is reduced by 3 μm ($=1.5$ μm$+1.5$ μm) from the designed value WT0 for the track area 4TB.

Further, in a digital video tape recorder, in order to assure a high recording density, the azimuth angles of the heads 1A to 1D are made so different as described above so that no guard band may be formed in the tracks 4 as seen in FIGS. 9A to 9C. To this end, for example, as shown in FIG. 12, actually the track widths WHA to WHD of the heads 1A to 1D are made greater than the track widths WTA to WTD of the tracks 4A to 4D so that edge portions of tracks formed by preceding or leading heads may be erased by following or trailing heads to adjust the track widths WTA to WTD of the tracks 4A to 4D to the designed value WT0.

Thus, it is assumed that the tolerance of the track width WHB of the head 1B (and heads 1A, 1C and 1D) is, for example, $\pm 1$ μm with respect to the designed value WH0, that is, $$WHB = WH0 \pm 1 \ \mu m \qquad (1)$$

Also it is assumed that the designed value WT0 of the track width WTB of the track area 4TB is $$\begin{aligned} WT0 &= \text{lower limit of tolerance of } WHB \\ &= WH0 - 1 \ \mu m \end{aligned} \qquad (2)$$

Consequently, from the equation (2) above, $$WH0 = WT0 + 1 \ \mu m \qquad (3)$$

Since the tolerance of $\pm 1$ μm is allowed for the track width WHB of the head 1B, the (actual) track width WHB of the head 1B is given, from the equations (1) and (3) above, by $$\begin{aligned} WHB &= WH0 \pm 1 \ \mu m \\ &= (WT0 + 1 \ \mu m) \pm 1 \ \mu m \end{aligned}$$

This similarly applies to the track widths WHA, WHC and WHD of the other heads 1A, 1C and 1D.

Further, it is assumed that, from errors of the offsets HHB and HHC, for example, as shown in FIG. 13 (the tracks 4B and 4C are same as in FIG. 11), the track area 4TB is formed with a width WTB smaller by 3 μm than the designed value WT0, that is, with the width WTB given by $$WTB = WT0 - 3 \ \mu m \qquad (4)$$

It is also assumed that the track width WHB of the head 1B of another video tape recorder which is used to edit the tape 3 has an error of $+1$ μm which is the upper limit of the tolerance, that is, it is assumed that the track width WHB is given by $$WHB = WH0 + 1 \ \mu m \qquad (5)$$

Consequently, the difference Δ between the track width WHB of the head 1B and the track width WTB of the track area 4TB is given by $$\Delta = WHB - WTB$$

and substituting the equations (4) and (5) above into the equation give just above, $$\begin{aligned} \Delta &= (WH0 + 1 \ \mu m) - (WT0 - 3 \ \mu m) \\ &= WH0 - WT0 + 4 \ \mu m \end{aligned} \qquad (6)$$

is obtained.

Then, substituting the equation (2) into the equation (6), $$\Delta = WH0 - (WH0 - 1 \mu m) + 4 \mu m$$
$$= 5 \mu m$$

is obtained.

Therefore, in the worst case, the track width WHB of the head 1B of the video tape recorder used for for editing is greater by 5 μm than the track width WTB of the track area 4TB of the tape 3. And, the width of 5 μm makes an insensitive zone in tracking servoing, and accordingly, tracking servoing becomes indefinite. In particular, if, for example, as shown in FIG. 14, the head 1B is within the range of (A) to (B) and (B) to (C) of FIG. 14 with respect to the track area 4TB, then it is considered that tracking is effective, and ±2.5 μm is the tracking accuracy then.

To a digital video tape recorder in which the track widths WTA to WTD of the tracks 4 are reduced so as to assure a high recording density, the value of ±2.5 μm in tracking accuracy is a considerably dissatisfactory value.

Besides, the errors of the track widths WTA to WTD of the tracks 4 are frequently increased by a temperature variation of the offsets HMA to HMD of the heads 1A to 1D, and in this instance, the difference value Δ is further increased, resulting in further degradation of the tracking accuracy.

If editing is performed while the tracking accuracy is degraded in this manner, a reproduced screen or reproduced sound will be disordered at a point where editing was started.

SUMMARY OF THE INVENTION

It is an object of the present invention to provide an information signal recording apparatus wherein a high degree of accuracy is assured for tracking servoing upon editing in which a digital video signal is divided into a plurality of channels and recorded in a plurality of tracks.

In order to attain the object described above, according to an aspect of the present invention, there is provided a recording apparatus wherein oblique tracks are formed on a tape by means of a rotary head apparatus to record an information signal in the oblique tracks, the recording apparatus having an ordinary recording mode and an editing mode in which the information signal is recorded additionally to the tape on which oblique tracks are formed already, wherein the recording apparatus forms a track area for tracking in an area at a predetermined position of every other one of the oblique tracks in a longitudinal direction of the track by a head of the rotary head apparatus but prevents another following head of the rotary head apparatus to form another track area at a corresponding position of the next adjacent oblique track adjacent the track area.

According to another aspect of the present invention, there is provided a recording apparatus wherein oblique tracks are formed on a tape by means of a rotary head apparatus to record an information signal, the recording apparatus having an ordinary recording mode and an editing mode in which the information signal is recorded additionally to the tape on which oblique tracks are formed already, comprising a recording control circuit for receiving a mode signal representative of an operation mode of the recording apparatus, a timing signal formation circuit for forming several timing and frequency signals from the information signal, a drum servo circuit for controlling the phase of rotation of the rotary head apparatus, a capstan servo circuit for controlling the feeding speed of the tape, and a tracking signal formation circuit for forming a tracking signal.

According to a further aspect of the present invention, there is provided a recording apparatus for recording an information signal, comprising means for dividing the information signal for each predetermined amount into N channels, N being an integral number equal to or greater than 2, a rotary magnetic head apparatus for recording the information signals of the N channels in N magnetic tracks on a magnetic tape, and means for causing the rotary magnetic head apparatus to record tracking signals into areas at predetermined positions in longitudinal directions of the N magnetic tracks independently of the information signals, the areas being positioned so that no magnetic track may be recorded at a position adjacent each of the areas in which the tracking signals are recorded.

According to a still further aspect of the present invention, there is provided a recording apparatus for recording an information signal, comprising means for dividing the information signal for each predetermined amount into N channels, N being an integral number equal to or greater than 2, a rotary magnetic head apparatus for recording the information signals of the N channels in N magnetic tracks on a magnetic tape, means for causing the rotary magnetic head apparatus to record a tracking signal into a first area at a predetermined position in a longitudinal direction of at least a particular one of the N magnetic tracks independently of the information signal, and means for preventing the rotary magnetic head apparatus from recording a tracking signal later into another area adjacent the first area and at a position in a longitudinal direction of any one of the magnetic tracks on the opposite sides of the particular track.

According to a yet further aspect of the present invention, there is provided a recording apparatus for recording an information signal, comprising means for dividing the information signal for each predetermined amount into N channels, N being an integral number equal to or greater than 2, a rotary magnetic head apparatus for recording the information signals of the N channels in N magnetic tracks on a magnetic tape, and means for causing the rotary magnetic head apparatus to record the information signal and a tracking signal in such a format that the tracking signal is recorded into a first area at a predetermined position in a longitudinal direction of at least a particular one of the N magnetic tracks independently of the information signal but the tracking signal is not recorded later into another area adjacent the first area and at a position in a longitudinal direction of any one of the magnetic tracks on the opposite sides of the particular track.

With the recording apparatus, even if the combination of the errors of the track widths of heads of the rotary magnetic head apparatus of a video tape recorder used for recording and the errors of the track widths of heads of the rotary magnetic head apparatus of another video tape recorder used for editing is in the worst, the accuracy in tracking servoing remains within the errors of the track widths.

Further, since editing is performed with such tracking accuracy immediately before an editing start point upon assemble editing or insert editing or during insert editing, assemble editing or insert editing can be performed with a sufficiently high degree of accuracy.

Accordingly, a reproduced screen or reproduced sound will not be disordered at the editing start point.

Further, where the heads of the rotary magnetic head apparatus are formed as thin film heads, the accuracy of the track widths can be further enhanced, and consequently, the tracking accuracy can be further enhanced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 3A to 3E are waveform diagrams illustrating operation of the video tape recorder shown in FIGS. 1 and 2;

FIG. 5 is a diagrammatic view showing a track pattern formed by the video tape recorder shown in FIGS. 1 and 2;

FIGS. 8A to 8D are waveform diagrams illustrating operation of a related video tape recorder;

DETAILED DESCRIPTION OF THE PREFERRED EMBODIMENT

According to the present invention, for example, as shown in FIG. 5, track areas 4TA and 4TC for tracking are formed at top portions of every other ones 4A and 4C of tracks 4 while no track areas are formed at locations adjacent the track areas 4TA and 4TC by following or trailing heads.

In particular, an information signal is first divided for each predetermined amount into four channels, and the information signals of the four channels are recorded in four oblique tracks 4A to 4D on a magnetic tape by means of four magnetic heads of a rotary magnetic head apparatus. Further, independently of the information signal, tracking signals STA and STC are recorded into particular areas 4TA and 4TC of every other ones 4A and 4C of the four magnetic tracks 4A to 4D at predetermined positions in the longitudinal direction of the tracks 4A and 4C. The areas 4TA and 4TC into which the tracking signals STA and STC are recorded are so positioned that, when the other ones 4B and 4D of the four magnetic tracks 4A to 4D are formed later, they are not formed at positions adjacent the areas 4TA and 4TC in which the tracking signals STA and STC are recorded.

Figure 10:
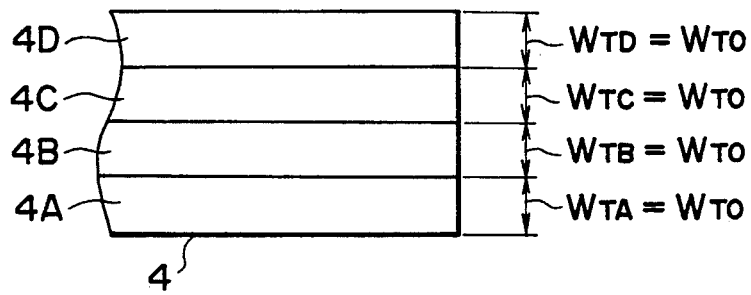
FIG. 10 is a diagrammatic view showing track widths of tracks formed by a related video tape recorder.
Figure 11:
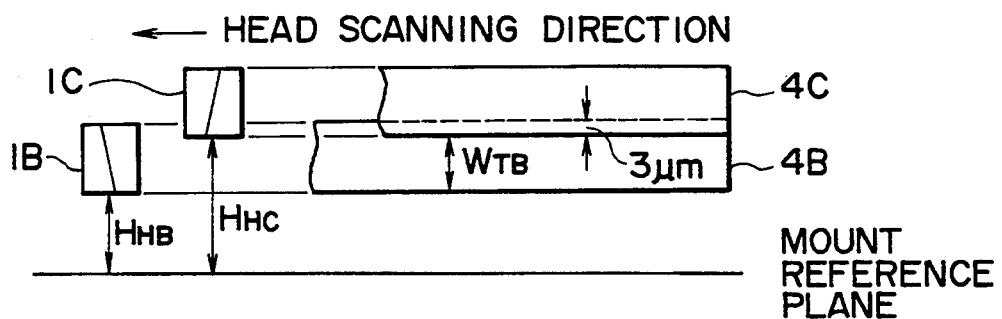
FIG. 11 is a diagrammatic view illustrating the relationship between head offsets of a related video tape recorder and track widths of tracks.
Figure 12:
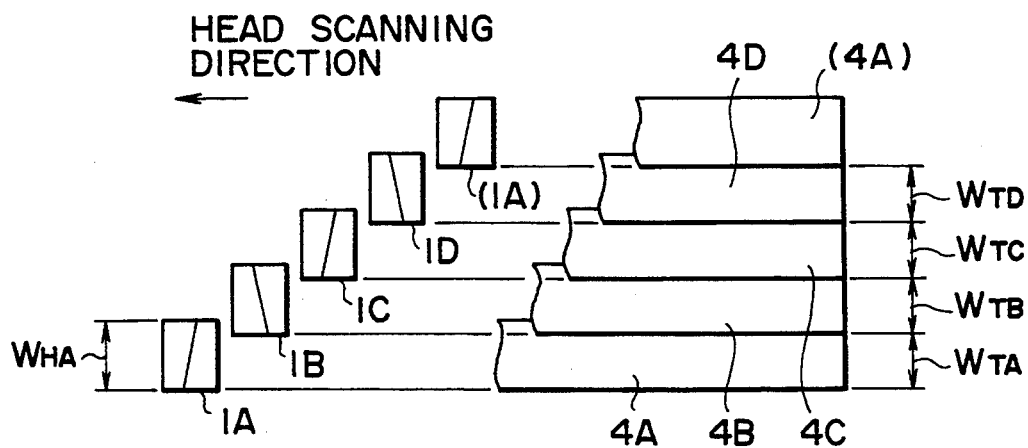
FIG. 12 is a diagrammatic view illustrating the relationship between heads of a related video tape recorder and track widths of tracks.
Figure 13:
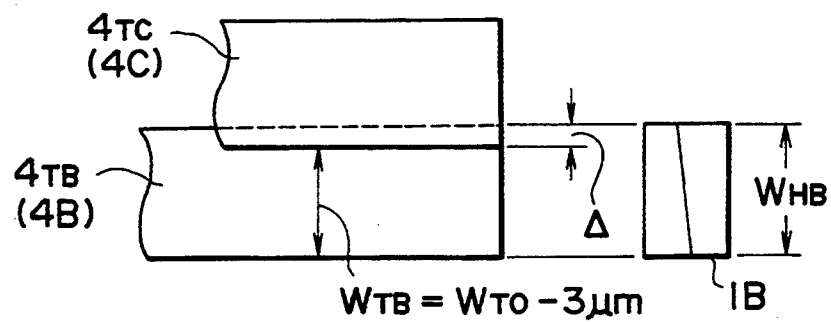
FIG. 13 is a diagrammatic view illustrating the relationship between a track formed by a related video tape recorder width of a track and tracking.
Figure 14:
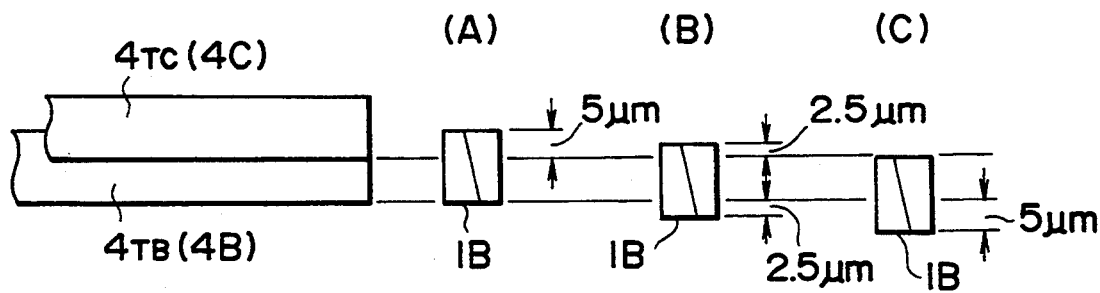
FIG. 14 is a diagrammatic view illustrating a track width of a track formed by a related video tape recorder and a tracking error.

Consequently, no other tracks are formed adjacent the track areas 4TA and 4TC in which the tracking signals are recorded. Accordingly, the track widths WTA and WTC (refer to FIG. 10) of the track areas 4TA and 4TC are equal to the track widths WHA and WHC (refer to FIG. 13) of the heads 1A and 1C, and consequently, the tracking accuracy remains within a tolerance of the track widths WHA and WHC of the heads 1A and 1C.

Figure 1:
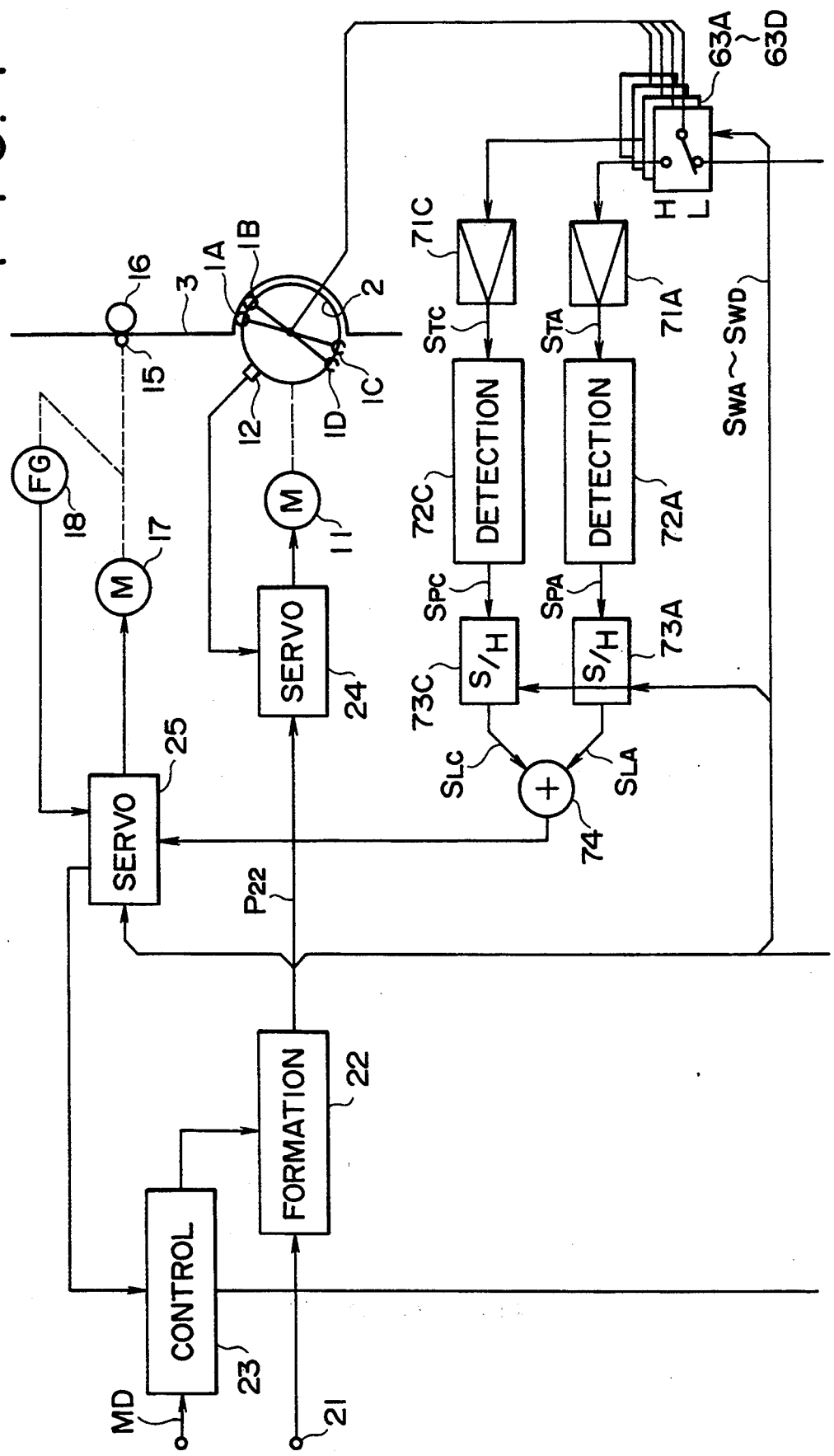
FIGS. 1 and 2 are block diagrams of different portions of a video tape recorder showing a preferred embodiment of the present invention.
Figure 2:
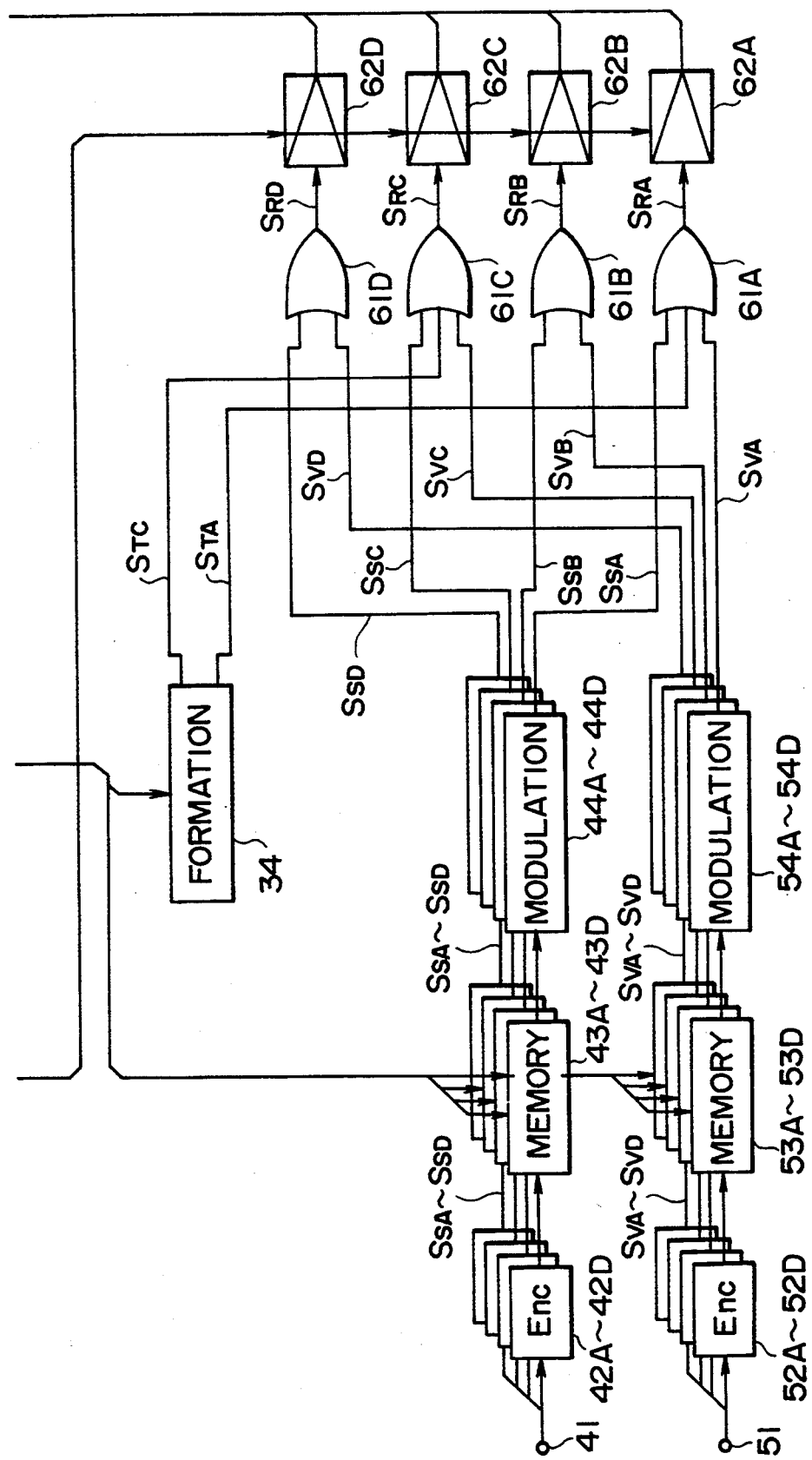

Referring now to FIGS. 1 and 2, there is shown a video tape recorder to which the present invention is applied. It is to be noted that FIG. 2 is contiguous at the top thereof to the bottom of FIG. 1.

Figure 7:
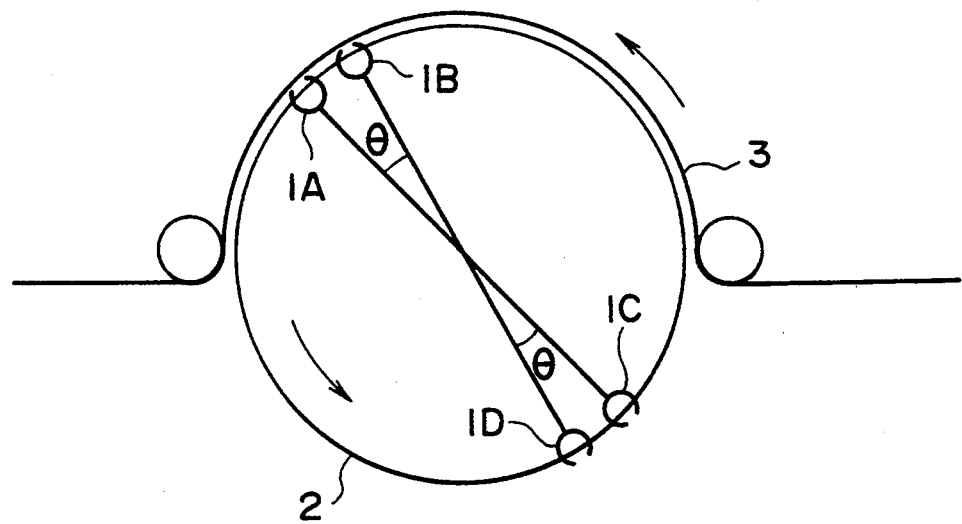
FIG. 7 is a schematic diagrammatic view showing an example of rotary magnetic head apparatus.

The video tape recorder includes a rotary magnetic head apparatus including magnetic heads 1A to 1D and a head drum 2 and having such a construction as described hereinabove with reference to FIG. 7. The rotary magnetic head apparatus is rotated, for example, in a field frequency by a motor 11. A magnetic tape 3 extends along and contacts with a circumferential face of the rotary magnetic head apparatus over an angular range greater than 180 degrees and is fed, upon recording, editing or reproduction, at a predetermined speed by a capstan 15 and a pinch roller 16.

The video tape recorder further includes a timing signal formation circuit 22 to which a video signal, which makes a reference for synchronization such as a station synchronizing signal, is supplied by way of a terminal 21. The timing signal formation circuit 22 thus forms various timing signals and frequency signals as well as such a pulse signal P22 of a reference field period as seen, for example, in FIG. 3A.

The video tape recorder further includes a recording control circuit 23 to which a mode signal MD representative of an operation mode such as a recording mode, an assemble editing mode or an insert editing mode from a system controller not shown. Operation of the formation circuit 22 and some other circuits is controlled in accordance with outputs of the control circuit 23.

The video tape recorder further includes a drum servoing circuit 24 to which the pulse signal P22 is supplied from the formation circuit 22 and also a pulse signal representative of a phase in rotation of the rotary magnetic head apparatus, that is, the heads 1A to 1D, is supplied from a pulse generator 12 provided for the drum 2. The output of the servo circuit 24 is supplied to the motor 11. Consequently, upon recording, editing or reproduction, the phase in rotation of the heads 1A to 1D is servo controlled with reference to the pulse signal P22.

The video tape recorder further includes a capstan servo circuit 25 to which an alternating signal of a predetermined frequency is supplied from the formation circuit 22 and also a signal of a frequency representative of the speed of rotation of the capstan 15 is supplied from a frequency generator 18 coupled in rotation to the capstan 15. The output of the servo circuit 25 is supplied to a capstan motor 17 so that the tape 3 is fed at a predetermined fixed speed upon recording or reproduction.

The video tape recorder further includes a signal formation circuit 34 for forming a tracking signal, encoder circuits 42A to 42D for a digital audio signal, memory circuits 43A to 43D for performing time base compression and adjusting recording timings, and modulation circuits 44A to 44D for performing modulation for recording. The video tape recorder further includes encoders 52A to 52D for a digital video signal, memory circuits 53A to 53D for performing time base compression and adjusting recording timings, and modulation circuits 54A to 54D for performing modulation for recording.

The video tape recorder further includes detection circuits 72A and 72C, amplitude detection circuits in this embodiment, for detecting the tracking signals and sampling hold circuits 73A and 73C.

In the video tape recorder, the following processing is performed upon ordinary recording, upon assemble editing and upon insert editing.

[Ordinary Recording]

Upon ordinary recording, control signals SWA to SWD of the "L" (low) level are taken out from the formation circuit 22, and switch circuits 63A to 63D are connected in such a condition as seen in FIG. 1 so that operation of recording amplifiers 62A to 62D is enabled in response to the control signals SWA to SWD, respectively, from the formation circuit 22.

Another predetermined control signal is supplied from the formation circuit 22 to the tracking signal formation circuit 34. Consequently, the tracking signal formation circuit 34 forms a tracking signal STA, for example, as shown in FIG. 3B, within a period around a start point of the former half TFR of each field period and then forms another tracking signal STC within another period around a start point of the latter half TBK of the field period. The tracking signals STA and STC are supplied to OR circuits 61A and 61C, respectively.

Further, a digital stereo audio signal is supplied by way of a terminal 41 to the encoder circuits 42A to 42D, by which it is subsequently divided into signals SSA to SSD of four A to D channels and encoding processing for error correction is performed for the signals SSA to SSD. Thereafter, the signals SSA to SSD are written into the memory circuits 43A to 43D, respectively.

Read-out of the memory circuits 43A to 43D is controlled by a signal from the formation circuit 22 such that, as seen from FIG. 3C, of the signals SSA to SSD written in the memory circuits 43A to 43D, the signals SSA and SSB of the A and B channels are read out in a time base compressed condition within a period following the tracking signal STA, and then the signals SSC and SSD of the C and D channels are read out similarly in a time base compressed condition within another period following the tracking signal STC.

The signals SSA to SSD read out in this manner are supplied to the modulation circuits 44A to 44D, respectively, in which modulation processing for recording is performed subsequently. The signals SSA to SSD, for which such modulation processing has been performed, are supplied to the OR circuits 61A to 61D, respectively.

Further, a digital video signal is supplied by way of another terminal 51 to the encoder circuits 52A to 52D, in which it is subsequently divided into signals SVA to SVD of the four A to D channels and encoding processing for error correction is performed for the signals SVA to SVD, respectively. Thereafter, the signals SVA to SVD are written into the memory circuits 53A to 53D, respectively.

Read-out of the memory circuits 53A to 53D is controlled by a signal from the formation circuit 22 such that, as seen from FIG. 3D, of the signals SVA to SVD written in the memory circuits 53A to 53D, the signals SVA and SVB of the A and B channels are read out in a time base compressed condition within a period following the digital audio signals SSA and SSB, and then the signals SVC and SVD of the C and D channels are read out similarly in a time base compressed condition within another period following the the digital audio signals SSC and SSD.

The signals SVA to SVD read out in this manner are supplied to the modulation circuits 54A to 54D, respectively, in which modulation processing for recording is performed subsequently. The signals SVA to SVD, for which such modulation processing has been performed, are supplied to the OR circuits 61A to 61D, respectively.

Accordingly, from the OR circuits 61A to 61D, signals SRA to SRD, for which such recording processing as described above has been performed, are outputted at such timings as seen in FIG. 3E. In particular, from the OR circuit 61A, the tracking signal STA, the digital audio signal SSA of the A channel and the digital video signal SVA of the A channel are successively extracted as its output signal SRA within the former half period TFR, and from the OR circuit 61B, the digital audio signal SSB of the B channel and the digital video signal SVB of the B channel are successively extracted within a period of the former half period TFR following the tracking signal STA.

Further, from the OR circuit 61C, the tracking signal STC, the digital audio signal SSC of the C channel and the digital video signal SVC of the C channel are successively extracted as its output signal SRC within the latter half period TBK, and from the 0R circuit 61D, the digital audio signal SSD of the D channel and the digital video signal SVD of the D channel are successively extracted as its output signal SRD within a period of the latter half period TBK following the tracking signal STC.

The signals SRA to SRD are supplied to the rotary heads 1A to 1D by way of the recording amplifiers 62A to 62D and the switch circuits 63A to 63D, respectively.

Accordingly, tracks 4 are formed at the ratio of one set for each one field on the tape 3 as shown in FIG. 5. In particular, within the former half period TFR, the signals STA, SSA and SVA of the signal SRA are recorded in track areas 4TA, 4SA and 4VA, respectively of a corresponding one of the tracks 4 by the head 1A while at the same time the signals SSB and the SVB of the signal SRB are recorded in track areas 4SB and 4VB, respectively, of another corresponding one of the tracks 4 by the head 1B. Then, within the latter half period TBK following the former half period TFR, the signals STC, SSC and SVC of the signal SRC are recorded in track areas 4TC, 4SC and 4VC, respectively, of a further corresponding one of the tracks 4 while at the same time the signals SSD and SVD of the signal SRD are recorded in track areas 4SD and 4VD, respectively, of the remaining one of the tracks by the head 1D.

Thereafter, such a sequence of recording operations as described above is repeated for each one field period so that the input digital stereo audio signal and the input digital video signal (and the tracking signals STA and STC) are successively recorded in a set of tracks 4 for each one field period.

Figure 9A:
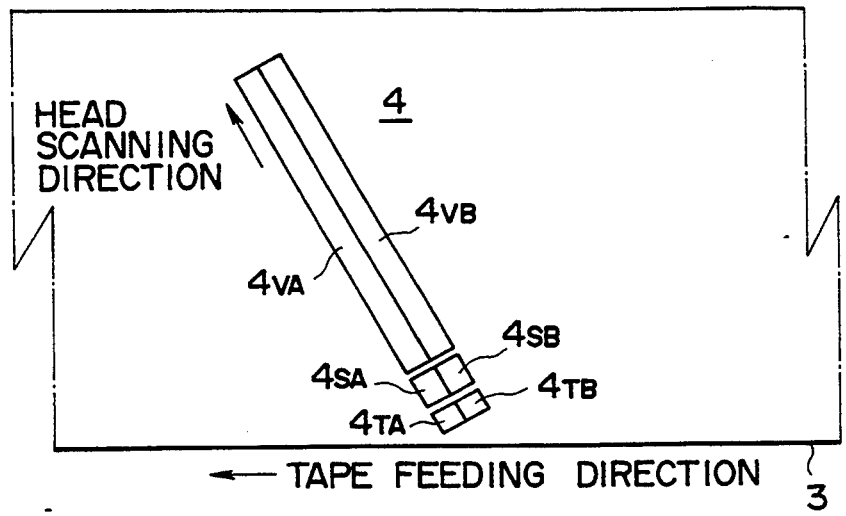
FIGS. 9A to 9C are diagrammatic views illustrating a track pattern formed by a related video tape recorder.
Figure 9B:
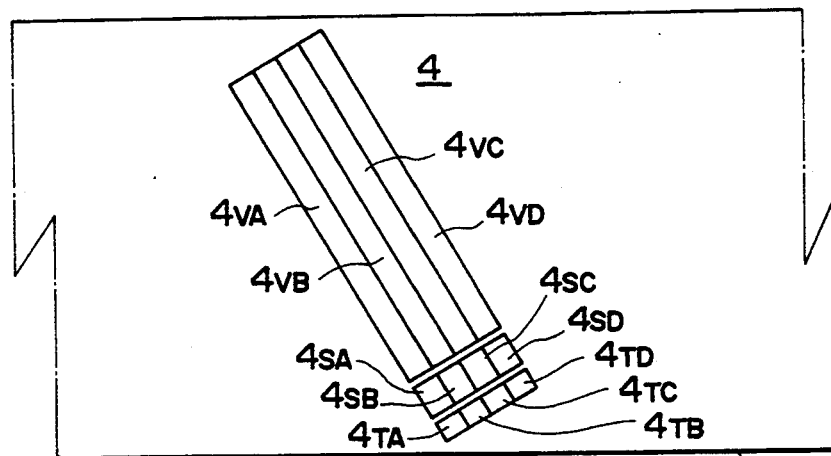

It is to be noted that, in this instance, since the tracking signals STA and STC are supplied to the heads 1A and 1C, respectively, the track areas 4TA and 4TC are formed in the corresponding two tracks 4, but since no tracking signals are supplied to the heads 1B and 1D, track areas 4TB and 4TD of FIG. 9B are not formed. Consequently, the corresponding end portions of the track areas 4TA and 4TC are not erased by overwriting, and accordingly, the track widths WTA and WTC of the track areas 4TA and 4TC remain equal to the track widths WHA and WHC of the heads 1A and 1C which have formed the track areas 4TA and 4TC, respectively.

[Assemble Editing]

Upon assemble editing, as described in the items (1) and (2) regarding editing hereinabove, the tape 3 is rewound, for example, for 3 minutes from an editing start point, and then, the video tape recorder is put into a reproduction condition from the thus rewound point. In this instance, within the period of the items (1) and (2), operation of the recording amplifiers 62A to 62D is inhibited in accordance with a control signal from the formation circuit 22.

Further, within the period of the item (2), signals are reproduced from the tracks 4A to 4D by the heads 1A to 1D, respectively. In this instance, in the A and C channels, the tracking signals STA and STC are reproduced first from the track areas 4TA and 4TC by the heads 1A and 1C, respectively, and then, the signals SSA and SSC are reproduced form the track areas 4SA and 4SC, respectively, whereafter the signals SVA and SVC are reproduced from the track areas 4VA and 4VC, respectively.

Figures 4A, 4B, 4C:
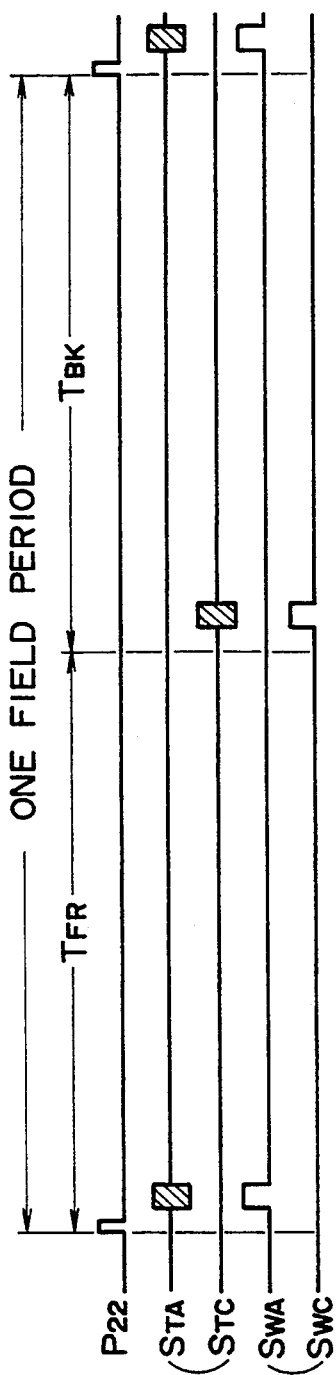
FIGS. 4A to 4C are waveform diagrams also illustrating operation of the video tape recorder shown in FIGS. 1 and 2.

Further, when the period of the item (2) is entered, the control signals SWA and SWC from the formation circuit 22 are changed over to the "H" (high) level corresponding to the tracking signals STA and STC as seen in FIG. 4C (FIGS. 4A and 4B are the same as FIGS. 3A and 3B, respectively), and the signals SWA and SWC are supplied to the switch circuits 63A and 63C, respectively Thus, when SWA and SWC="H", the switch circuits 63A and 63C are connected in a condition reverse to that shown in FIG. 1. It is to be noted that the signals SWB and SWD remain at the "L" (low) level, and consequently, the switch circuits 63B and 63D remain in the connection condition shown in FIG. 1.

Consequently, of the reproduction signals of the heads 1A to 1D, the tracking signals STA and STC are extracted by way of the switch circuits 63A and 63C and supplied by way of reproduction amplifiers 71A and 71C to amplitude detection circuits 72A and 72C, by which the tracking signals STA and STC are detected by amplitude detection, respectively. Consequently, signals SPA and SPC representative of reproduction levels of the signals STA and STC are extracted from the detection circuit 72A and 72C, respectively.

The signals SPA and SPC are supplied to sampling hold circuits 73A and 73C so that the levels of the signals SPA and SPC are sampled and held by the sampling hold circuits 73A and 73C, respectively, in accordance with a control signal from the formation circuit 22. Consequently, signals SLA and SLC representative of the levels of the reproduced tracking signals STA and STC are extracted from the sampling hold circuits 73A and 73C, respectively. The signals SLA and SLC are supplied to and added to each other by an addition circuit 74, and the addition signal of the addition circuit 74 is supplied to a servo circuit 25. Consequently, feeding of the tape 3 is servo controlled in response to the addition signal by the servo circuit 25 so that the levels of the tracking signals STA and STC reproduced from the track areas 4TA and 4TC may exhibit their maximum levels, respectively.

When the levels of the tracking signals STA and STC reproduced from the track areas 4TA and 4TC reach their maximum levels, notification of this is transmitted to the control circuit 23.

Thereafter, when the tape 3 comes to the editing start point (when the condition of the item (3) described above is entered), the formation circuit 22 is controlled by the control circuit 23 so that the signals SWA to SWD are changed over to the "L" level. Consequently, the switch circuits 63A to 63D are changed over to the connection condition shown in FIG. 1. Further, recording signals SRA to SRD are formed by the circuits 34 and 42A to 61D in a similar manner as upon ordinary recording described above, and operation of the amplifiers 62A to 62D is enabled.

Since the thus formed signals SRA to SRD are supplied to the heads 1A to 1D by way of the amplifiers 62A to 62D and the switch circuits 63A to 63D, respectively, a new digital audio signal and a new digital video signal (and new tracking signals) are formed in new tracks 4 from the editing start point.

In this instance, the tracks 4 in which the new signals are recorded are formed with reference to the positions of the old tracks 4 just prior to the editing start point. Accordingly, at the editing start point, new recording is started without any disorder of the periodicity of the tracks 4, and consequently, assemble editing is performed.

[Insert Editing]

Also upon, operation similar to that upon assemble editing described above is performed within the period of the items (1) and (2).

Then, also after the editing start point of the tape 3 is reached (and the condition of the item (3) described above is entered), similarly as within the period of the item (2), the control signals SWA and SWC are changed over to the "H" level at the same timings as the tracking signals STA and STC as seen in FIG. 4C, respectively. The signals SWA and SWC are supplied to the switch circuits 63A and 63C so that, when the signals SWA and SWC are at the "H" level, the switch circuits 63A and 63C are connected in the reverse condition to that shown in FIG. 1. It is to be noted that the signals SWB and SWD remain at the "L" level, and consequently, the switch circuits 63B and 63D remain in the connection condition shown in FIG. 1.

Accordingly, even after the editing start point of the tape 3 is passed, the tracking signals STA and STC are reproduced from the track areas 4TA and 4TC while tracking servoing is performed by the servo circuit 25 so that the levels of the tracking signals STA and STC may present their maximum levels, respectively.

Further, from the editing start point of the tape 3, recording signals SRA to SRD are formed by the circuits 42A to 61D in a similar manner as upon ordinary recording described above, and operation of the amplifiers 62A to 62D is enabled. In this instance, however, formation of tracking signals STA and STC by the formation circuit 34 is not performed, and accordingly, no tracking signals STA and STC are included in the signals SRA and SRC, respectively. In short, the signals SRA to SRD include digital audio signals SSA to SSD and digital video signals SVA to SVD as seen in FIG. 3E.

The signals SRA to SRD are supplied to the heads 1A to 1D by way of the amplifiers 62A to 62D and the switch circuits 63A to 63D, respectively. In this instance, the heads 1A to 1D are controlled by tracking servoing to the track areas 4TA and 4TC which were recorded in the past.

Accordingly, the new digital audio signal and the new digital video signal are recorded with reference to the positions of the formerly recorded track areas 4TA and 4TC from the editing start point. In other words, new recording is performed without any disorder in periodicity of the tracks 4 at the editing start point, and consequently, insert editing of the digital audio signal and the digital video signal is performed.

Further, when only one of a digital audio signal and a digital video signal is to be recorded by insert editing, read-out is performed only from those of the memory circuits 43A to 43D and 53A to 53D in which signals to be recorded by insert editing are stored while read-out is not performed from the remaining memory circuits in which signals which are not to be recorded by insert editing are stored. Further, operation of the amplifiers 62A to 62D is disabled within a period corresponding to a signal which is not used for insert editing.

Consequently, the new digital audio signal or digital video signal is recorded with reference to the positions of the formerly recorded track areas 4TA and 4TC from the editing start point, and only the digital audio signal or digital video signal is recorded by insert editing.

[Summary]

Figure 9C:
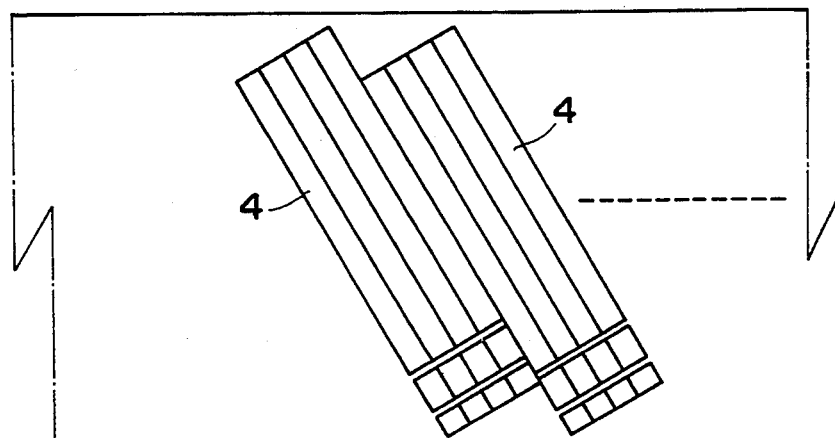

Assemble editing and insert editing are individually performed in such manners as described above. In this instance, however, such track areas 4TB and 4TD as shown in FIG. 9 are not formed adjacent the track areas 4TA and 4TC. Accordingly, edge portions of the track areas 4TA and 4TC are not erased by overwriting of adjacent track areas, and consequently, the track widths WTA and WTC of the track areas 4TA and 4TC remain equal to the track widths WHA and WHC of the heads 1A and 1C upon recording.

As a result, the tracking accuracy is $\pm 1$ $\mu$m at the editing start point.

In other words, since no track is formed on either side of the track area 4TA after the track area 4TA is formed, the track width WTA will not be varied. Accordingly, the track width WTA of the track area 4TA recorded formerly from the editing start point is equal to the track width WHA of the head 1A upon recording and is $$WTA = WHA \quad (11)$$

Meanwhile, the tolerance of the track width WHA of the head 1A of a video tape recorder used for recording is $\pm 1$ $\mu$m with respect to the designed value WH0 and accordingly is $$WHA = WH0 \pm 1 \ \mu m \quad (12)$$

Also the track width WHA of the head 1A of another video tape recorder used for editing is given by the equation (12) above.

Now, if it is assumed that the video tape recorder used for recording is in the worst condition and the track width WHA of the head 1A of the video tape recorder is at its lower limit of the tolerance, then the track width WHA is given by $$WHA = WH0 - 1 \ \mu m$$

Accordingly, in this instance, the track width WTA of the track area 4TA is given, from the equation (11) above, by $$WTA = WHA \quad (13)$$
$$= WH0 - 1 \ \mu m$$

On the other hand, if the track width WHA of the head 1A of the video tape recorder used for editing is at its upper limit of the tolerance, then $$WHA = WH0 + 1 \ \mu m \quad (14)$$

Accordingly, the difference $\Delta$ between the track width WHA of the head 1A of the video tape recorder used for editing and the track width WTA of the track area 4TA of the tape 3 is given by $$\Delta = WHA - WTA$$

Accordingly, substituting the equations (13) and (14) above into the equation just above, $$\Delta = (WH0 + 1 \ \mu m) - (WH0 - 1 \ \mu m)$$
$$= 2 \ \mu m$$

is obtained.

In other words, even if the combination of the error of the track width WHA of the head 1A of the video tape recorder used for recording and the error of the track width WHA of the head 1A of the video tape recorder used for editing is in the worst, the track width WHA of the head 1A of the video tape recorder used for editing is increased by only 2 $\mu$m than the recorded track area 4TA. In short, the insensitive band in tracking servoing is 2 $\mu$m in width, and the tracking accuracy of $\pm 1$ $\mu$m can be assured.

Further, since servoing control is performed such that the levels of the tracking signals STA and STC reproduced from the track areas 4TA and 4TC having such track widths WTA and WTC may be maximum immediately before the editing start point in assemble editing and insert editing, the tracking accuracy in this instance is $\pm 1$ $\mu$m.

Accordingly, even if assemble editing or insert editing is performed, the positions of tracks recorded newly are not displaced by more than $\pm 1$ $\mu$m from the formerly recorded tracks 4, and accordingly, assemble editing and insert editing can be performed with a high degree of accuracy. As a result, a reproduced screen or reproduced sound is not disordered at the editing start point.

Further, where the heads 1A to 1D are formed as thin film heads, the accuracy of the track widths WHA to WHD is further enhanced, and consequently, the tracking accuracy can be further enhanced.

Figure 6:
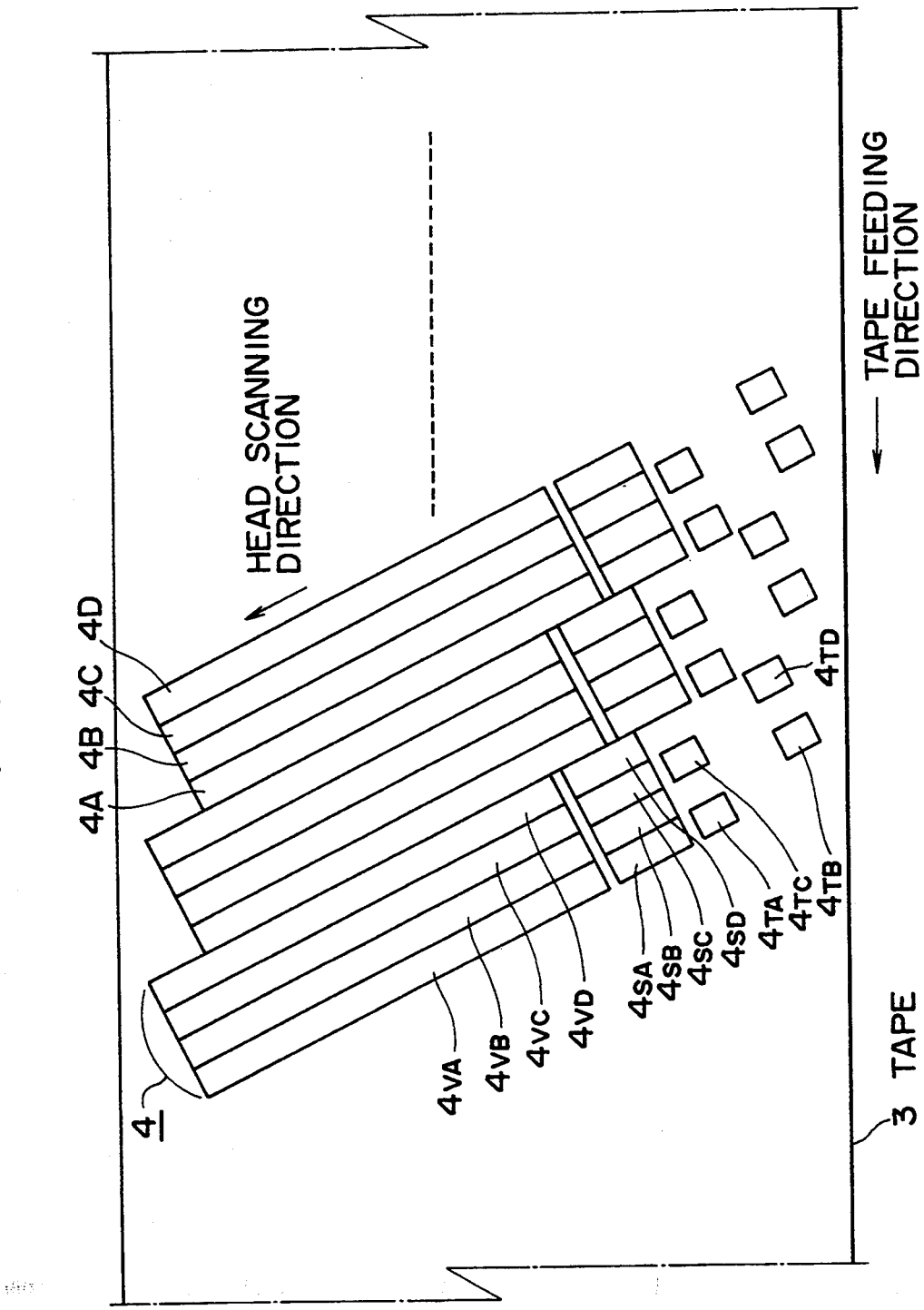
FIG. 6 is a similar view but showing another track pattern which may be formed by the video tape recorder shown in FIGS. 1 and 2.

It is to be noted that, while, in the video tape recorder described above, track areas (4TA and 4TC) for tracking are formed only for the tracks 4A and 4C, they may alternatively be formed (as track areas 4TA to 4TD for tracking) for all of the tracks 4A to 4D. In this instance, the track areas 4TA and 4TC should be displaced in the longitudinal direction of the tracks 4 from the track areas 4TB and 4TD, for example, as seen in FIG. 6 so that another track area may not be formed later on either side of each of the track areas 4TA to 4TD.

Further, while, in the video tape recorder described above, the track areas 4TA and 4TC are formed on the starting or leading sides of the tracks 4A and 4C, such track areas 4TA and 4TC or the track areas 4TB and 4TD may be formed at some other locations of the corresponding tracks 4 such as, for example, at the trailing end positions of the corresponding tracks 4. Further, the signals STA and STC to be recorded in the track areas 4TA and 4TC may be of some other format only if they can be used as detection signals for a tracking error.

Meanwhile, if new signals SSA to SSD or SVA to SVD are recorded, upon editing, with reference to the positions of the track areas 4TA and 4TC in the longitudinal direction of the tracks 4, then the positions of the track areas 4SA to 4SD and 4VA to 4VD are not displaced in the longitudinal direction of the tracks 4.

Having now fully described the invention, it will be apparent to one of ordinary skill in the art that many changes and modifications can be made thereto without departing from the spirit and scope of the invention as set forth herein.

What is claimed is:

1. In a recording apparatus wherein oblique tracks are formed on a tape by means of a rotary head apparatus having a plurality of heads, each head having a first predetermined width, to record an information signal in the oblique tracks, said recording apparatus having an ordinary recording mode and an editing mode in which the information signal is recorded additionally to the tape on which oblique tracks are formed already, wherein said recording apparatus comprises tracking signal formation means for forming a plurality of tracking signals, said tracking signal formation means being in communication with said rotary head apparatus for recording each of said plurality of tracking signals by a corresponding head of said rotary head apparatus in a track area having a width equal to said first predetermined width and located at a predetermined position in every other one of the oblique tracks in a longitudinal direction of the track, said tracking signal formation means being operative to prevent a following head of said rotary head apparatus to form another track area at a corresponding position of the next adjacent oblique track adjacent said track area.

2. A recording apparatus according to claim 1, wherein a tracking signal is recorded in the track area independently of the information signal.

3. A recording apparatus wherein oblique tracks are formed on a tape by means of a rotary head apparatus having a plurality of heads, each head having a first predetermined width, to record an information signal, said recording apparatus having an ordinary recording mode and an editing mode in which the information signal is recorded on the tape on which oblique tracks have already been formed, comprising:

a recording control circuit for receiving a mode signal representative of an operation mode of said recording apparatus;

a timing signal formation circuit in communication with said recording control circuit for forming timing and frequency signals from the information signal;

a drum servo circuit in communication with said timing signal formation circuit for controlling the phase of rotation of said rotary head apparatus;

a capstan servo circuit in communication with said timing signal formation circuit for controlling the feeding speed of the tape; and a tracking signal formation circuit in communication with said timing signal formation circuit for forming a tracking signal in a track area having a width equal to said first predetermined width but not forming another track area at a corresponding position of a next adjacent oblique track adjacent said track area.

4. A recording apparatus according to claim 3, wherein, when said recording apparatus is in the ordinary recording mode, said timing signal formation circuit causes, under the control of said recording control circuit, said rotary head apparatus to record the information signal and the tracking signal formed by said tracking signal formation circuit such that the tracking signal is recorded into a first area at a predetermined position in a longitudinal direction of at least a particular one of each N oblique tracks independently of the information signal but the tracking signal is not recorded later into another area adjacent the first area and at a position in a longitudinal direction of any one of the N oblique tracks on the opposite sides of the particular track, N being an integral number equal to or greater than 2.

5. A recording apparatus according to claim 3, wherein, when said recording apparatus is in an editing mode, said timing signal formation circuit causes, under the control of said recording control circuit, said capstan servo circuit and said rotary head apparatus to operate such that the tape is first fed from a predetermined position of the tape by a predetermined amount in the reverse direction and then fed in the forward direction and information recorded on the oblique tracks is read out by said rotary head apparatus to detect a tracking signal and then causes, after the predetermined position of the tape is reached, said rotary head apparatus to record the information signal and the tracking signal formed by said tracking signal formation circuit such that the tracking signal is recorded into a first area at a predetermined position in a longitudinal direction of at least a particular one of each N oblique tracks independently of the information signal but the tracking signal is not recorded later into another area adjacent the first area and at a position in a longitudinal direction of any one of the N oblique tracks on the opposite sides of the particular track, N being an integral number equal to or greater than 2.

6. A recording apparatus according to claim 3, wherein, when said recording apparatus is in an editing mode, said timing signal formation circuit causes, under the control of said recording control circuit, said capstan servo circuit and said rotary head apparatus to operate such that the tape is first fed from a predetermined position of the tape by a predetermined amount in the reverse direction and then fed in the forward direction and information recorded on the oblique tracks is read out by said rotary head apparatus to detect a tracking signal and then causes, after the predetermined position of the tape is reached, said rotary head apparatus to record the information signal.

7. A recording apparatus according to claim 3, wherein said timing signal formation circuit forms a reference pulse signal of a one field period.

8. A recording apparatus according to claim 3, wherein said timing signal formation circuit is controlled by said recording control circuit.

9. A recording apparatus according to claim 3, wherein said drum servo circuit receives a rotational phase signal of said rotary head apparatus and controls the phase of rotation of said rotary head apparatus with reference to a reference pulse signal received from said timing signal formation circuit.

10. A recording apparatus according to claim 3, wherein said capstan servo circuit receives a signal representative of a speed of rotation of a capstan and controls the phase of rotation of said capstan with reference to a reference pulse signal received from said timing signal formation circuit.

11. A recording apparatus according to claim 3, wherein the mode signal is received from a system controller and represents one of operation modes including a recording mode, an assemble editing mode and an insert editing mode.

12. A recording apparatus for recording an information signal, comprising:
    means for dividing the information signal into N channels, N being an integral number equal to or greater than 2;
    a rotary magnetic head apparatus for recording the information signals of the N channels in N magnetic tracks on a magnetic tape; and
    means for causing said rotary magnetic head apparatus to record tracking signals into areas at predetermined positions in longitudinal directions of the N magnetic tracks independently of the information signals, the areas being positioned so that no magnetic track is recorded at a position adjacent each of the areas in which the tracking signals are recorded.

13. A recording apparatus for recording an information signal, comprising:
    means for dividing the information signal into N channels, N being an integral number equal to or greater than 2;
    a rotary magnetic head apparatus having N magnetic heads, each head having a first predetermined width, for recording the information signals of the N channels in N magnetic tracks on a magnetic tape;
    means for causing said rotary magnetic head apparatus to record a tracking signal into a first area having a width equal to said first predetermined width and located at a predetermined position in a longitudinal direction of at least a particular one of the N magnetic tracks independently of the information signal; and
    means for preventing said rotary magnetic head apparatus from recording a tracking signal at a later time into another area adjacent the first area such that another track area is not formed adjacent to the first area and at a position in a longitudinal direction of any one of the magnetic tracks on the opposite sides of the particular track.

14. A recording apparatus for recording an information signal, comprising:
    means for dividing the information signal into N channels, N being an integral number equal to or greater than 2;
    a rotary magnetic head apparatus having N magnetic heads, each head having a first predetermined width, for recording the information signals of the N channels in N magnetic tracks on a magnetic tape; and
    means for causing said rotary magnetic head apparatus to record the information signal and a tracking signal in such a format that the tracking signal is recorded into a first area having a width equal to said first predetermined width and located at a predetermined position in a longitudinal direction of at least a particular one of the N magnetic tracks independently of the information signal but the tracking signal is not recorded at a later time into another area adjacent the first area such that another track area is not formed adjacent to the first area and at a position in a longitudinal direction of any one of the magnetic tracks on the opposite sides of the particular track.

* * * * *